United States Patent
Hsu et al.

(10) Patent No.: US 10,111,081 B2
(45) Date of Patent: Oct. 23, 2018

(54) LOCAL COMMUNICATION WIRELESS NETWORK SYSTEM AND METHOD THEREOF

(71) Applicant: GEMTEK TECHNOLOGY CO., LTD., Hsinchu (TW)

(72) Inventors: Ching-Sung Hsu, Hsinchu (TW); Shih-Chiang Yang, Hsinchu (TW); Pao-Ching Tseng, Hsinchu (TW); Fu-Ming Yeh, Hsinchu (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 183 days.

(21) Appl. No.: 15/191,876

(22) Filed: Jun. 24, 2016

(65) Prior Publication Data

US 2017/0303112 A1    Oct. 19, 2017

(30) Foreign Application Priority Data

Apr. 13, 2016    (TW) .............................. 105111556 A

(51) Int. Cl.
| | |
|---|---|
| *H04W 8/00* | (2009.01) |
| *H04L 29/12* | (2006.01) |
| *H04W 24/02* | (2009.01) |
| *H04W 8/18* | (2009.01) |
| *H04W 88/08* | (2009.01) |

(52) U.S. Cl.
CPC ......... *H04W 8/005* (2013.01); *H04L 61/2007* (2013.01); *H04L 61/2038* (2013.01); *H04W 24/02* (2013.01); *H04L 61/103* (2013.01); *H04L 61/6022* (2013.01); *H04W 8/186* (2013.01); *H04W 88/08* (2013.01)

(58) Field of Classification Search
CPC . H04L 29/12; H04L 61/3075; H04L 61/2038; H04L 61/2007; H04W 24/02; H04W 8/005
See application file for complete search history.

(56) References Cited

U.S. PATENT DOCUMENTS

| | | | | |
|---|---|---|---|---|
| 2014/0155019 | A1* | 6/2014 | Schwartz | H04W 76/10 455/404.1 |
| 2014/0308923 | A1* | 10/2014 | Faulkner | H04W 48/20 455/411 |
| 2014/0355444 | A1* | 12/2014 | Turtinen | H04W 8/005 370/235 |
| 2015/0173111 | A1* | 6/2015 | Agarwal | H04W 8/04 370/329 |
| 2016/0212784 | A1* | 7/2016 | Fujishiro | H04W 76/023 |

* cited by examiner

*Primary Examiner* — Charles C Jiang
*Assistant Examiner* — Kyaw Z Soe
(74) *Attorney, Agent, or Firm* — Rosenberg, Klein & Lee

(57) ABSTRACT

The present invention relates to a local communication wireless network system and the method thereof. When the wireless base station is not connected with the evolved packet core (EPC) server, the wireless base station can emulate the EPC server. The electronic devices connected to the wireless base station can connect to the emulated EPC server. The client unit of the wireless base station can collect the identification information of the electronic devices connected to the wireless base station, build an identification list, and send the identification list to the electronic devices connected to the wireless base station. Thereby, the electronic devices can send messages or perform digital voice or video calls to other electronic devices according to the identification list.

16 Claims, 15 Drawing Sheets

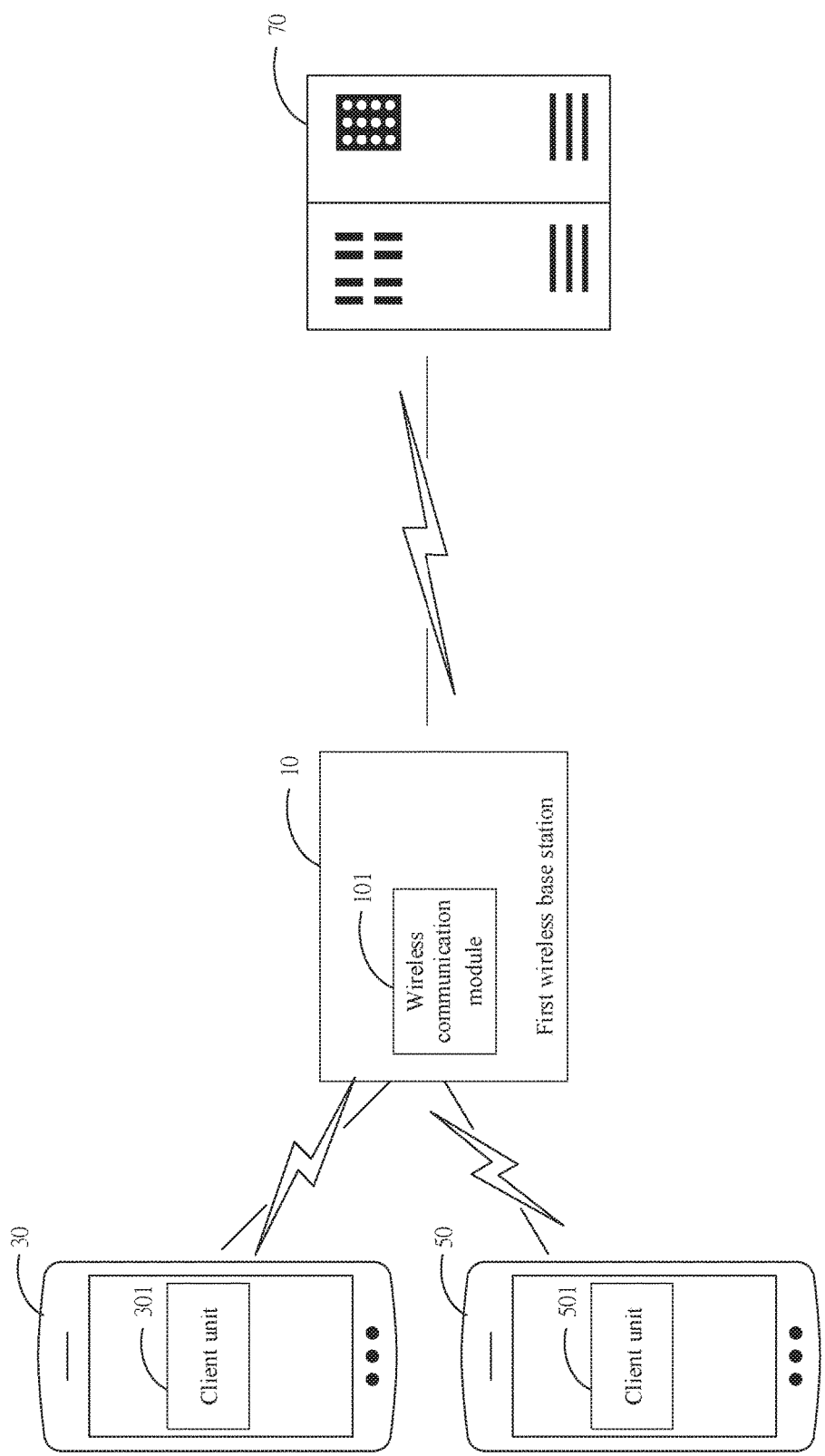

LOCAL COMMUNICATION WIRELESS NETWORK SYSTEM AND METHOD THEREOF

FIELD OF THE INVENTION

The present invention relates generally to a wireless communication system and the method thereof, and particularly to a local communication wireless network system and the method thereof applicable when the wireless base station is not connected to the evolved packet core server.

BACKGROUND OF THE INVENTION

As wireless network technologies become mature and popular gradually, wireless surfing has become an indispensable part of people's daily lives currently. Because the Internet is a part of our daily lives, the associated networking equipment has become must-have household electronic equipment. Network users can communicate with wireless base stations through electronic devices having wireless communication functionality, such as smartphones, digital mobile assistants, notebook computers, or tablet computers. By using this communication method, no physical wire, for example, optic fibers and coaxial cables, is required for connecting to the Internet and browsing and sharing data. It is thereby a convenient networking technique.

A base station is a high-power and multi-channel wireless signal transceiver deployed at a location. The typical application of a base station is to act as a relay station for smartphones, digital mobile assistants, notebook computers, tablet computers, or other low-power wireless communication equipment. The wireless signals transmitted by the above equipment will be received and transmitted by base stations. After receiving and transmitting by multiple base stations, the wireless signals will be sent to the evolved packet core (EPC) server of Internet service providers. Then the wireless signals are transmitted to the Internet through the EPC server.

Nonetheless, as the wireless base station is not connected to the EPC server, for example, when an accident situation occurs due to power failure at the location of the EPC server or damages at the relay nodes, the wireless signal transmitted by the wireless base station cannot be received by the EPC server completely. Then the electronic devices connected with the wireless base station will disconnect from the EPC server. Under such a circumstance, the electronic devices will be unable to communicate with other electronic devices.

In addition, owing to data security concerns or other reasons, some enterprises or government institutions need to transmit signals among electronic devices when the base station is not connected to the EPC server.

Accordingly, it has become an important subject of how to enable communications among the electronic devices connected to the wireless base station when there is no connection between the wireless base station and the EPC server.

SUMMARY

An objective of the present invention is to provide a local communication wireless network system and the method thereof. When the wireless base station is not connected with the EPC server, the wireless base station can emulate the EPC server and collecting the identification information of the electronic devices connected to the wireless base station. Thereby, via the wireless base station, the electronic devices can send messages or perform digital voice or video calls to other electronic devices.

In order to achieve the above objectives and efficacies, according to an embodiment of the present invention, a local communication wireless network method applicable when a wireless base station is not connected to an EPC server is disclosed. The method comprises steps of the wireless base station emulating the EPC server; connecting a wireless communication module of the wireless base station to the emulated EPC server; connecting a plurality of electronic devices including a first electronic device and a second electronic device to the emulated EPC server via the wireless communication module; each of said plurality of electronic devices transmitting its own identification information to the wireless base station; generating an identification list according to the identification information of each of said plurality of electronic devices; sending the identification list to each of said plurality of electronic devices in the identification list; and the first electronic device sending a message to the second electronic device according to the identification information corresponding to the second electronic device in the identification list.

According to an embodiment of the present invention, the message includes the identification information of the second electronic device and a message body.

According to an embodiment of the present invention, the message body includes text, picture, voice, or arbitrary combination of the above.

According to an embodiment of the present invention, the identification information of each electronic device includes an identification code, a phone number, a media access control address, or an arbitrary combination of the above.

According to an embodiment of the present invention, a local IP address is further assigned to each electronic device.

According to an embodiment of the present invention, the identification information of each electronic device includes an identification code, a phone number, a media access control address, the local IP address, or an arbitrary combination of the above.

According to an embodiment of the present invention, the first electronic device performs a digital voice call or a video call to the second electronic device via the emulated EPC server and according to the local IP address in the identification information of the second electronic device.

In addition, the present invention provides a local communication wireless network system, which comprises a wireless base station. The wireless base station comprises an emulated EPC server, a wireless communication module, a broker unit, and a client unit. The emulated EPC server emulates an EPC server. The wireless communication module is connected to the EPC server or the emulated EPC server. A plurality of electronic devices include a first electronic device and a second electronic device. Each electronic device includes a client unit. The plurality of electronic devices are connected to the EPC server or the emulated EPC server via the wireless communication module. When the wireless base station is not connected to the EPC server, the emulated EPC server emulates the EPC server. The wireless communication module is connected to the emulated EPC server. The plurality of electronic devices are connected to the emulated EPC server via the wireless communication module. Each electronic device transmits its own identification information to the broker unit. The broker unit receives the identification information of each electronic device and transmits the identification information to the client unit of the wireless base station. The client unit of the wireless base station generates an identification list according to the identification information of each electronic device and sends the identification list to the broker unit. The broker unit sends the identification list to each electronic device in the identification list. Then the first electronic device sends a message to the second electronic device according to the identification information corresponding to the second electronic device in the identification list.

According to an embodiment of the present invention, the message includes the identification information of the second electronic device and a message body.

According to an embodiment of the present invention, the message body includes text, picture, voice, or arbitrary combination of the above.

According to an embodiment of the present invention, the identification information of each electronic device includes an identification code, a phone number, a media access control address, or an arbitrary combination of the above.

According to an embodiment of the present invention, a local IP address is further assigned to each electronic device.

According to an embodiment of the present invention, the identification information of each electronic device includes an identification code, a phone number, a media access control address, the local IP address, or an arbitrary combination of the above.

According to an embodiment of the present invention, the first electronic device performs a digital voice call or a video call to the second electronic device via the emulated EPC server and according to the local IP address in the identification information of the second electronic device.

BRIEF DESCRIPTION OF THE DRAWINGS

FIGS. 3A to 3F show schematic diagrams of the operations of the local communication wireless network system according to the first embodiment of the present invention;

DETAILED DESCRIPTION

In order to make the structure and characteristics as well as the effectiveness of the present invention to be further understood and recognized, the detailed description of the present invention is provided as follows along with embodiments and accompanying figures.

According to the prior art, it has become an important subject of how to enable communications among a plurality of electronic devices connected to the wireless base station given the wireless base station is not connected to the EPC server. Accordingly, the present invention provides a local communication wireless network system and the method thereof. According to the present invention, when the wireless base station is not connected to the EPC server, the wireless base station can emulate the EPC server. Thereby, communications among a plurality of electronic devices connected to the wireless base station become feasible.

Figure 1:
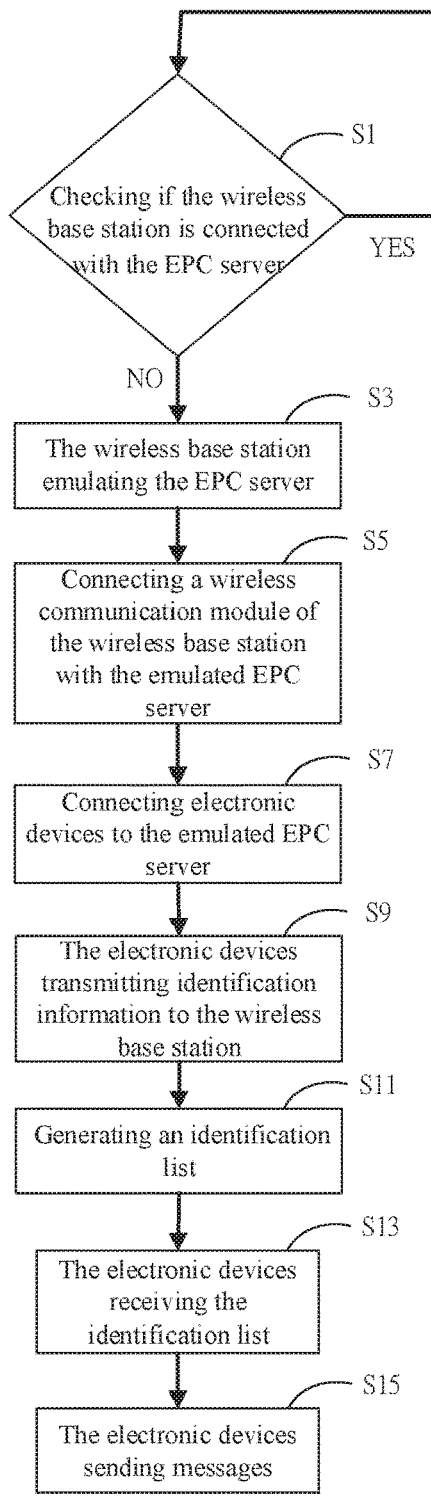
FIG. 1 shows a flowchart of the local communication wireless network method according to the first embodiment of the present invention.

In the following, the process of the local communication wireless network method according to the first embodiment of the present invention will be described. Please refer to FIG. 1, which shows a flowchart of the local communication wireless network method according to the first embodiment of the present invention. As shown in the figure, the local communication wireless network method according to the present embodiment comprises steps of:

Step S1: Checking if the wireless base station is connected with the EPC server such as the server of an Internet service provider; if so, the step S1 being executed continuously; if not, the step S3 being executed Step S3: The wireless base station emulating the EPC server and becoming an emulated EPC server, and thus enabling the wireless base station to execute a part of or all of the functions of the EPC server;

Step S5: Connecting a wireless communication module of the wireless base station with the emulated EPC server;

Step S7: Connecting electronic devices to the emulated EPC server via the wireless communication module of the wireless base station:

Step S9: The electronic devices transmitting identification information to the wireless base station;

Step S11: Generating an identification list according to the identification information of the electronic devices;

Step S13: The electronic devices receiving the identification list;

Step S15: The electronic devices sending messages to other electronic devices according to the identification information in the identification list and thus performing local communication.

Figure 2:
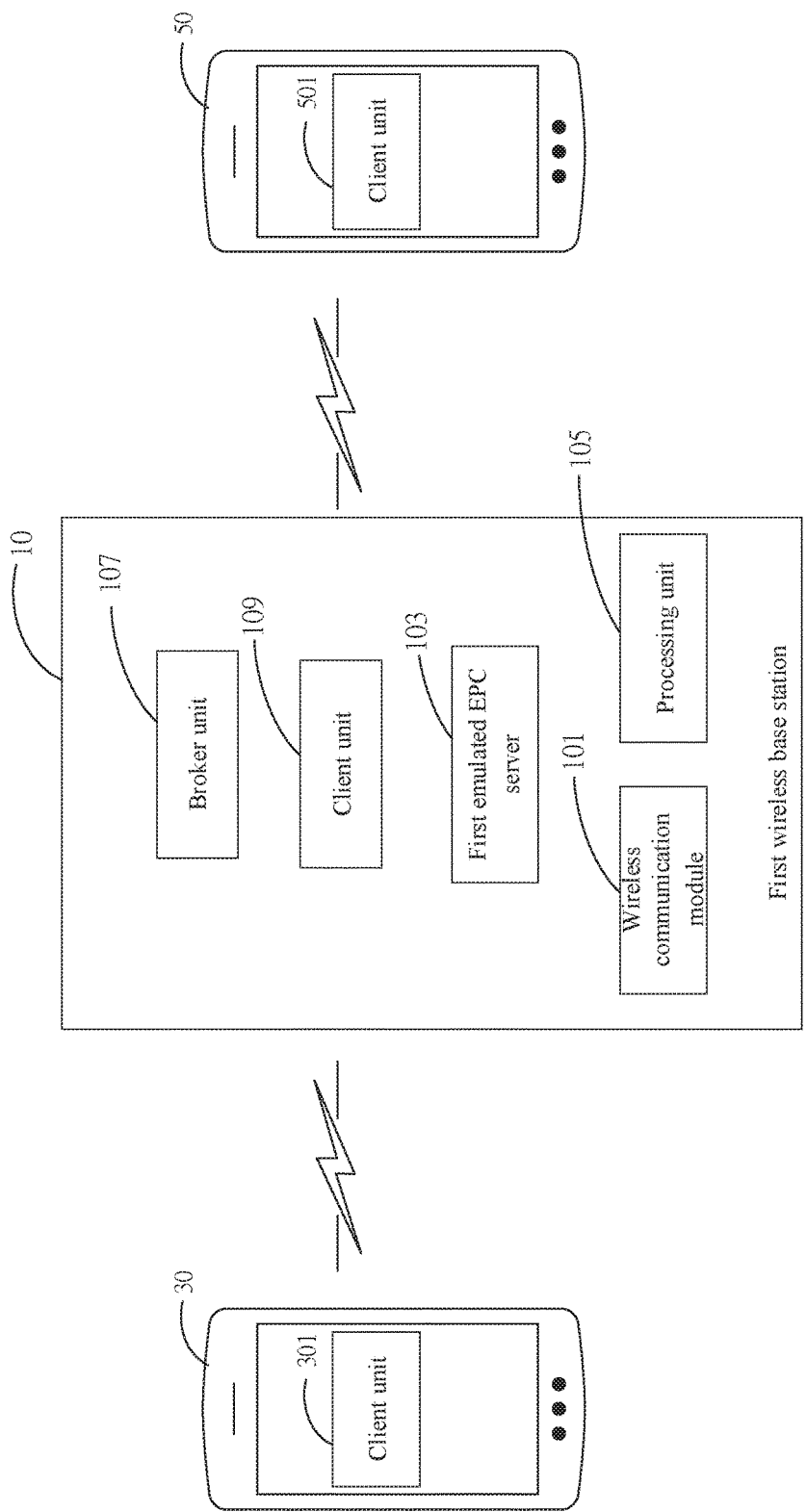
FIG. 2 shows a block diagram of the local communication wireless network method according to the first embodiment of the present invention.

Next, the local communication wireless network system according to the first embodiment of the present invention will be described. Please refer to FIG. 2, which shows a block diagram of the local communication wireless network system according to the first embodiment of the present invention. As shown in the figure, the wireless network system according to the present invention comprises a first wireless base station 10, which comprises a wireless communication module 101, a first emulated EPC server 103, and a processing unit 105, a broker unit 107, and a client unit 109. A plurality of electronic devices are connected with the first wireless base station 10. According to the present embodiment, the electronic devices connected with the first wireless base station 10 include a first electronic device 30 and a second electronic device 50. The first electronic device 30 includes a client unit 301; the second electronic device 50 includes a client unit 501.

The broker unit 107 is a message queuing telemetry transport (MQTT) broker using the MQTT protocol. The client units 109, 301, 501 are MQTT clients using the MQTT protocol.

The wireless communication module 101 described above is a module having the function of receiving and transmitting wireless signals. The wireless communication module 101 can adopt communication protocols such as LTE, Wi-Fi, GPRS, or others to receive and transmit wireless signals. The wireless communication module 101 is used for connecting to the general EPC server or the first emulated EPC server 103.

The first emulated EPC server 103 described above is used for emulating an EPC server at startup and thus enabling the first wireless base station 10 to emulate the EPC server. The first emulated EPC server 103 owns a part of or all of the functions of a general EPC server. The first emulated EPC server 103 can include one or more of the mobility management entity (MME), serving gateway (SGW), packet data network gateway (PGW), or home subscriber server (HSS). The above processing unit 105 is an electronic device capable of arithmetic and logic operations.

The first and second electronic devices 30, 50 described above can be a device having wireless networking functionality, including a smartphone, a personal digital assistant (PDA), a tablet computer, a notebook computer, and a desktop computer.

Figure 3B:
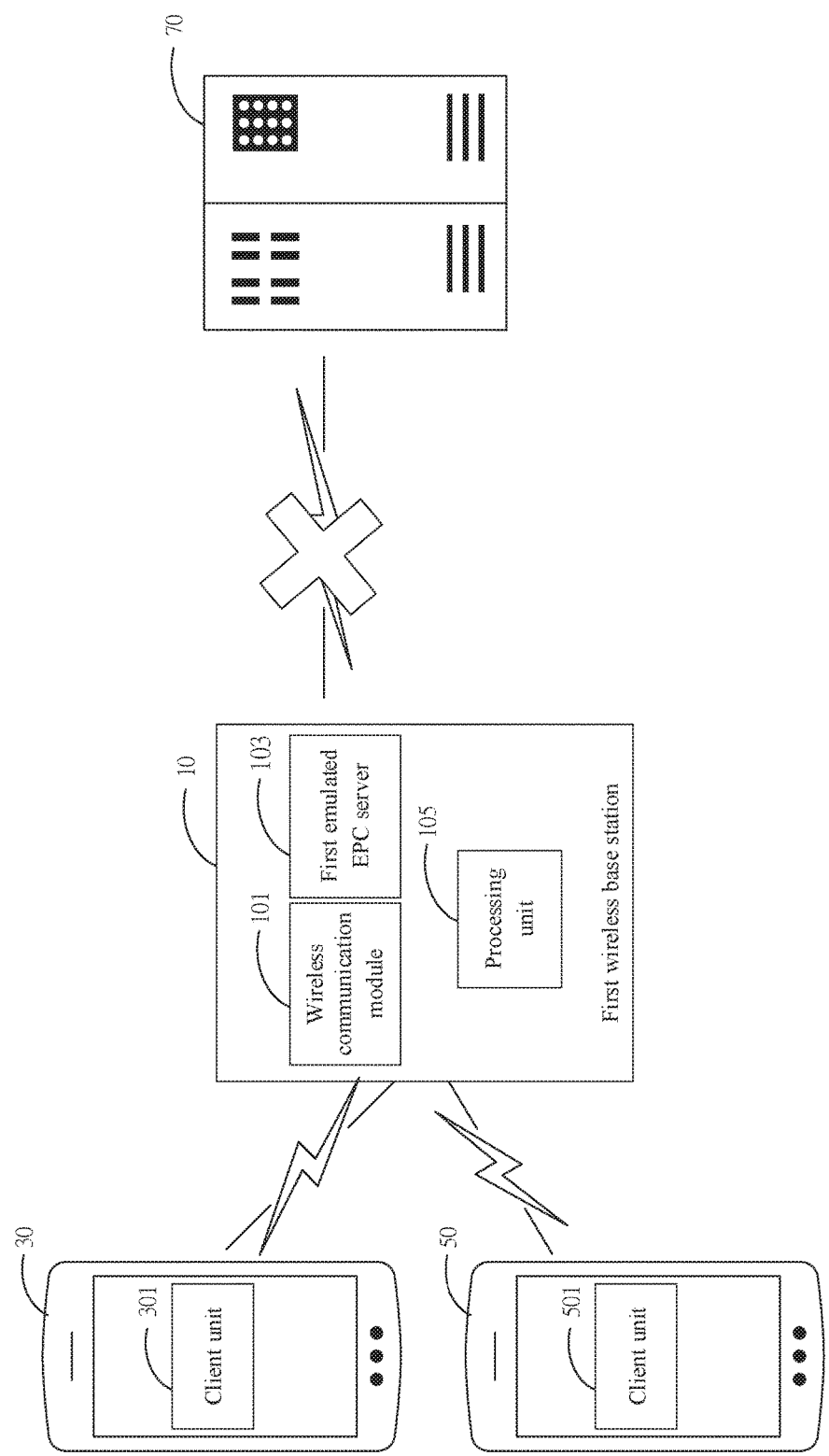

In the following, the process of executing the local communication wireless network method according to the first embodiment of the present invention will be described. Please refer to FIGS. 3A to 3F as well as FIGS. 1 and 2. As shown in FIG. 3A, under the normal condition, the first and second electronic devices 30, 50 are connected with the EPC server 70 through the wireless communication module 101 of the first wireless base station 10. In addition, the first wireless base station 10 will execute the step S1. If the wireless communication module 101 of the first wireless base station 10 is not connected to the EPC server 70, the steps S3 through S15 will be executed.

In the step S1, whether the first wireless base station 10 is connected with the EPC server 70 is checked. The processing unit 105 checks if the connection between the wireless communication module 101 and the EPC server 70 is normal periodically. The processing unit 105 judges if the connection between the wireless communication module 101 and the EPC server 70 is normal by the wireless communication module 101 pinging the EPC server 70 or the heartbeat detection result in the SCTP protocol. When the processing unit 105 judges normal, the step S1 will be continued. Otherwise, the step S3 will be executed.

According to another embodiment of the present invention, in the step S1, in addition to checking if the connection between the wireless communication module 101 and the EPC server 70 is normal periodically, the processing unit 105 will further check the connection between the wireless communication module 101 and the element management system (EMS, not shown in the figures), which is used for managing and configuring the parameters and states of the first wireless base station 10. The processing unit 105 judges if the wireless communication module 101 is connected with the EMS according to the returned keep-alive result of the HTTP protocol placed by the wireless communication module 101 to the EMS.

In the step S3, the first wireless base station 10 will emulate the EPC server 70. As shown in FIG. 3B, the first wireless base station 10 will start the first emulated EPC server 103. Then the first wireless base station 10 can emulate the EPC server 70 through the first emulated EPC server 103. Then the first wireless base station 10 can emulate the EPC server 70. If the first emulated EPC server 103 includes one or more of the MME, SGW, PGW, or HSS, when the processing unit 105 starts the first emulated EPC server 103, the MME, SGW, PGW, or HSS contained in the first emulated EPC server 103 will be started as well. Alternatively, the first emulated EPC server 103 can also start one or more of the MME, SGW, PGW, or HSS according to requirements.

According to an embodiment, in the step S3, the processing unit 105 starts the first wireless base station 10 first, before it starts the first emulated EPC server 103. Thereby, the cache data in the first wireless base station 10 can be cleared. Besides, the connection between the first electronic device 30 and the first wireless base station 10 and the connection between the second electronic device 50 and the first wireless base station 10 are interrupted.

In the step S5, the wireless communication module 101 of the first wireless base station 10 is connected to the first emulated EPC server 103.

Figure 3C:
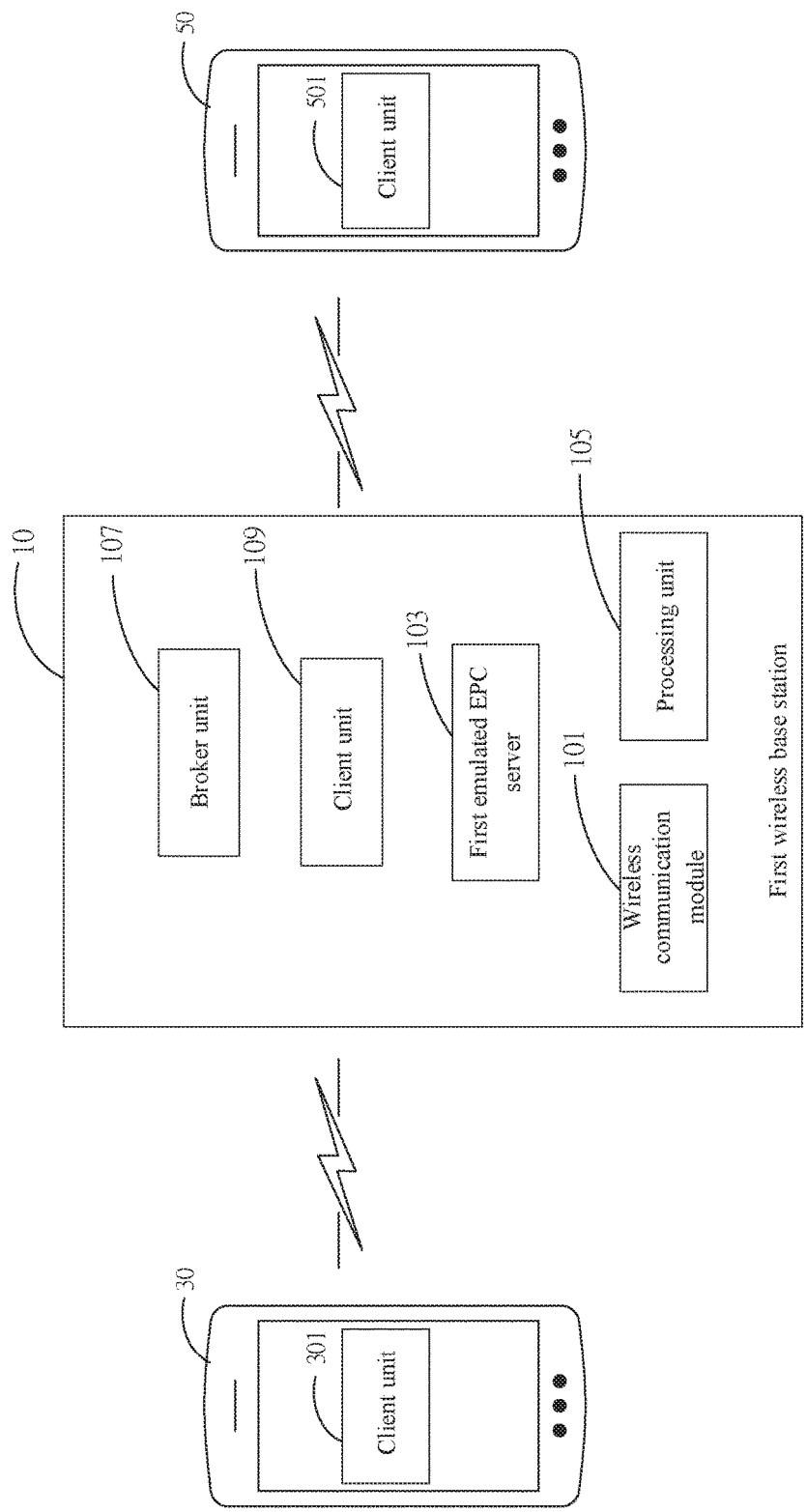

In the step S7, the electronic devices are connected to the first emulated EPC server 103. As shown in FIG. 3C, the first and second electronic devices 30, 50 are connected to the first emulated EPC server 103 through the wireless communication module 101. After the first and second electronic devices 30, 50 are connected to the first emulated EPC server 103, the first emulated EPC server 103 assigns a local IP address to the first electronic device 30 and another local IP address to the second electronic device 50. In other words, if there are multiple electronic devices connected to the first emulated EPC server 103, the first emulated EPC server 103 will assign one local IP address for each of the electronic devices connected with the first emulated EPC server 103.

Figure 3D:
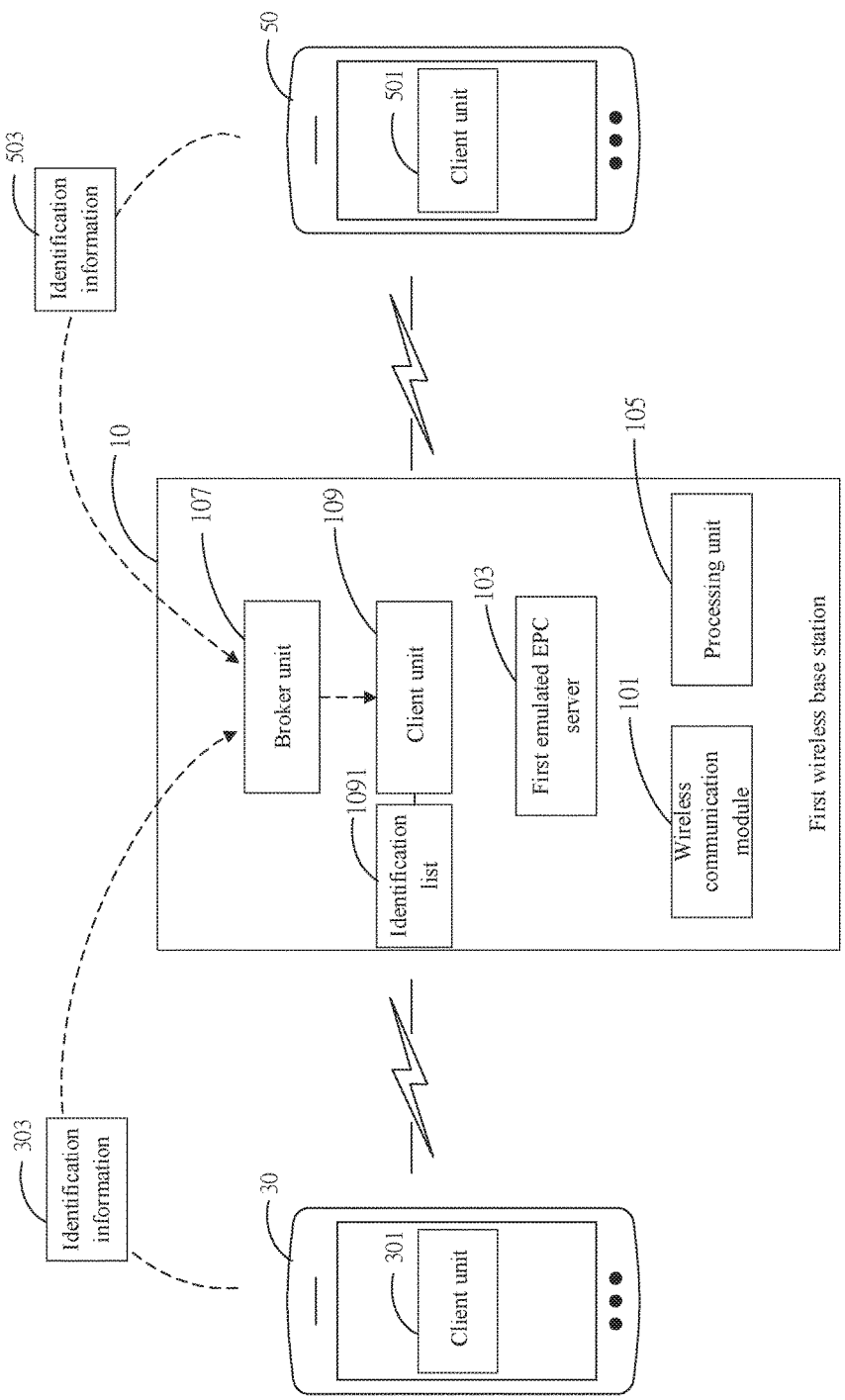

In the step S9, the electronic device sends the identification information. As shown in FIG. 3D, the first electronic device 30 sends its own identification information 303 to the first wireless base station 10; the second electronic device 50 also sends its own identification information 503 to the first wireless base station 10. In other words, each electronic device connected with the first wireless base station 10 will send its own identification information to the first wireless base station 10. The identification information includes an identification code, a phone number, a media access control address, a local IP address, or an arbitrary combination of the above of the electronic device.

When the electronic device publishes its own identification information to the first wireless base station 10, the broker unit 107 will receive the identification information transmitted by the electronic device. Because the broker unit 107 of the first wireless base station 10 is preset that the client unit 109 of the first wireless base station 10 has subscribed all identification information, the broker unit 107 will transmit the received identification information to the client unit 109 of the first wireless base station 10 as it receives the identification information of the electronic device. When the electronic device publishes its own identification information, the transmitted packet complies with the MQTT protocol. The topic in the packet of the adopted MQTT protocol is "identification information". The content of the packet includes the identification code, the phone number, the media access control address, the local IP address, or an arbitrary combination of the above of the electronic device. That is to say, the content of the packet includes the identification information of the electronic device.

In the step S11, the identification list is generated. As shown in FIG. 3D, after the client unit 109 of the first wireless base station 10 receives the identification information, the client unit 109 will generate an identification list 1091 according to the identification information. The identification list 1091 records all identification information.

Figure 3E:
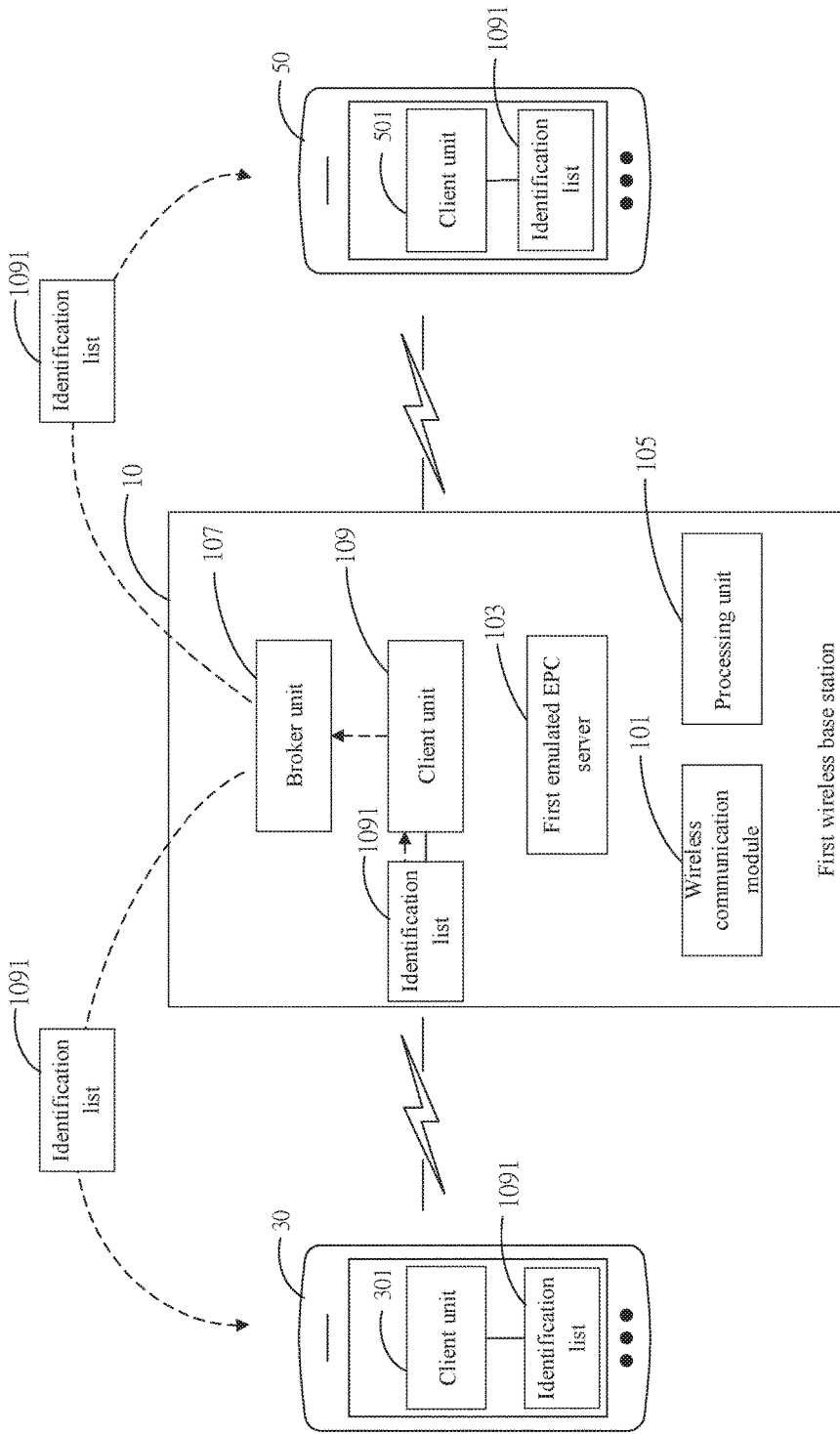

In the step S13, the electronic device will receive the identification list. As shown in FIG. 3E, after the identification list 1091 is generated, it will be transmitted to all the electronic devices recorded therein. To elaborate, the client unit 109 will publish the identification list 1091 to the broker unit 107. The broker unit 107 is preset that the client units of all the electronic devices recorded in the identification list 1091 have subscribed the identification list 1091. Thereby, when the broker unit 107 receives the identification list 1091 published by the client unit 109, the broker unit 107 will transmit the identification list 1091 to all the electronic devices recorded in the identification list 1091. As the client unit 109 publishes the identification list 1091 to the broker unit 107, the transmitted packets complies with the MQTT protocol. The topic of the packets using the MQTT protocol is "identification list". The content of the packets include the identification list 1091. According another embodiment of the present invention, after connecting to the first wireless base station 10, the client units of the electronic devices can send a subscription message to the broker unit 107 for subscribing the identification list 1091 from the broker unit 107.

Figure 3F:
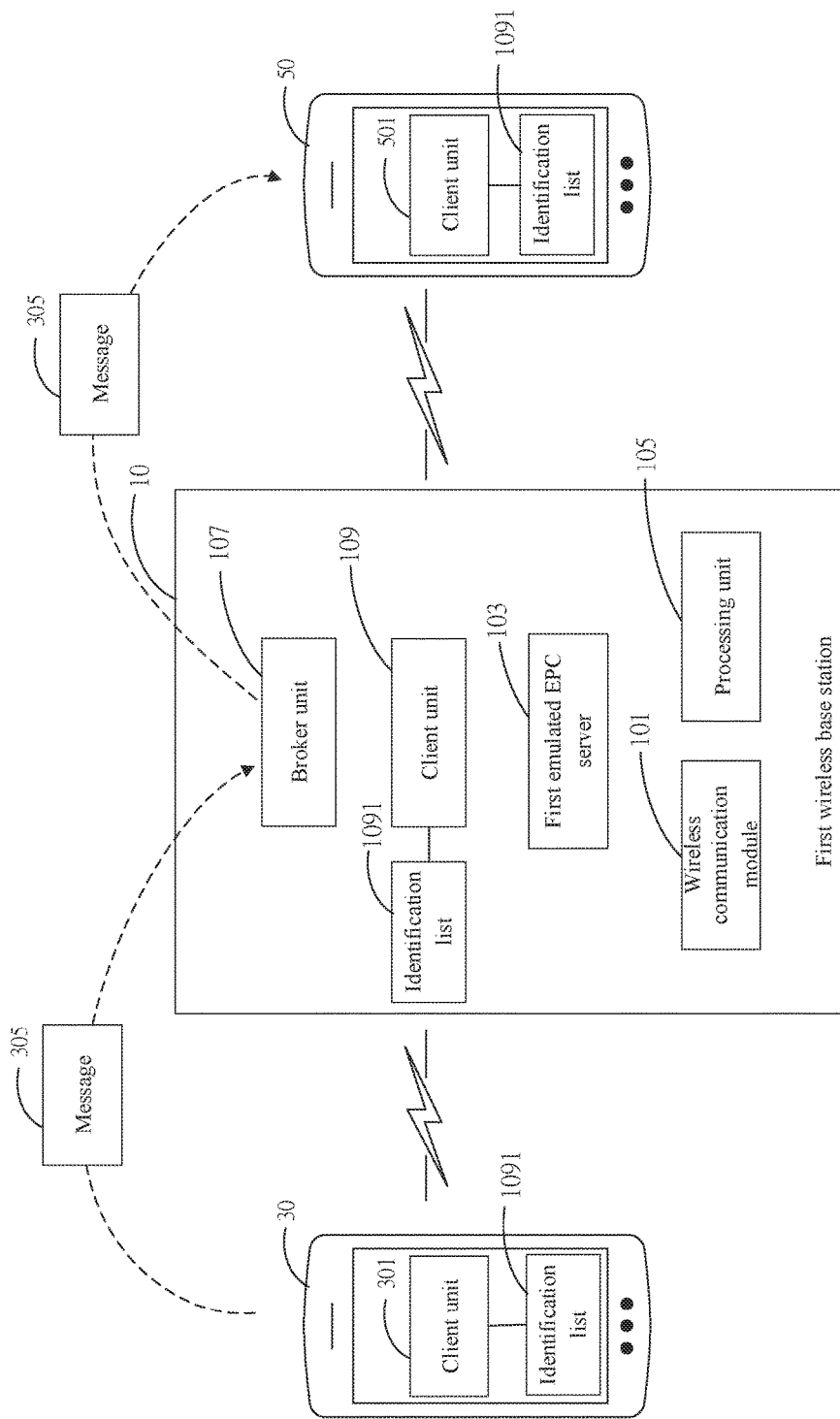

In the step S15, a message is sent. As shown in FIG. 3F, when the first electronic device 30 is to send a message 305 containing the identification information and a message body to the second electronic device 50, the first electronic device 30 acquires the corresponding identification information 503 of the second electronic device 50 from the identification list 1091 for publishing the message 305. The client unit 301 of the first electronic device 30 publishes the message 305 to the broker unit 107, which uses the MQTT protocol to transmit packets. The topic of the packet is "message". The topic includes the identification information 503 of the second electronic device 50, meaning that the packet is submitted to the second electronic device 50. The content of the packet is the message body, which includes text, pictures, voice, video, or an arbitrary combination of the above. The broker unit 107 sends the packet to the second electronic device 50 according to the identification information 503. Thus the message 305 is sent to the second electronic device 50.

According to an embodiment of the present invention, the broker unit 107 is preset that all the electronic devices connected with the first wireless base station 10 subscribe the packets containing their identification information in the topic. According to another embodiment of the present invention, the client units of the electronic devices can also send a subscription message to the broker unit 107 after they are connected to the first wireless base station 10 for subscribing the packets containing their identification information in the topic from the broker unit 107.

In addition, the first electronic device 30 can also acquire the corresponding local IP address of the second electronic device 50 from the identification list 1091. Then the first electronic device 30 can perform a digital voice or video call via the first emulated EPC server 103 using the corresponding local IP address of the second electronic device 50.

Up to now, the local communication wireless network method according to the first embodiment of the present invention is completed. The method is applicable when the wireless base station is not connected with the EPC server. According to the method, the client unit of the electronic devices connected with the wireless base station can publish their own identification information to the broker unit of the wireless base station. Accordingly, the client unit of the wireless base station can generate the identification list according to the identification information of the plurality of electronic devices. The broker unit of the wireless base station can further transmit the identification list to the plurality of electronic devices. Then the electronic devices can communication with other electronic devices connected with 1I the wireless base station through the identification information in the identification list, and thus forming a local wireless communication network.

Figure 4:
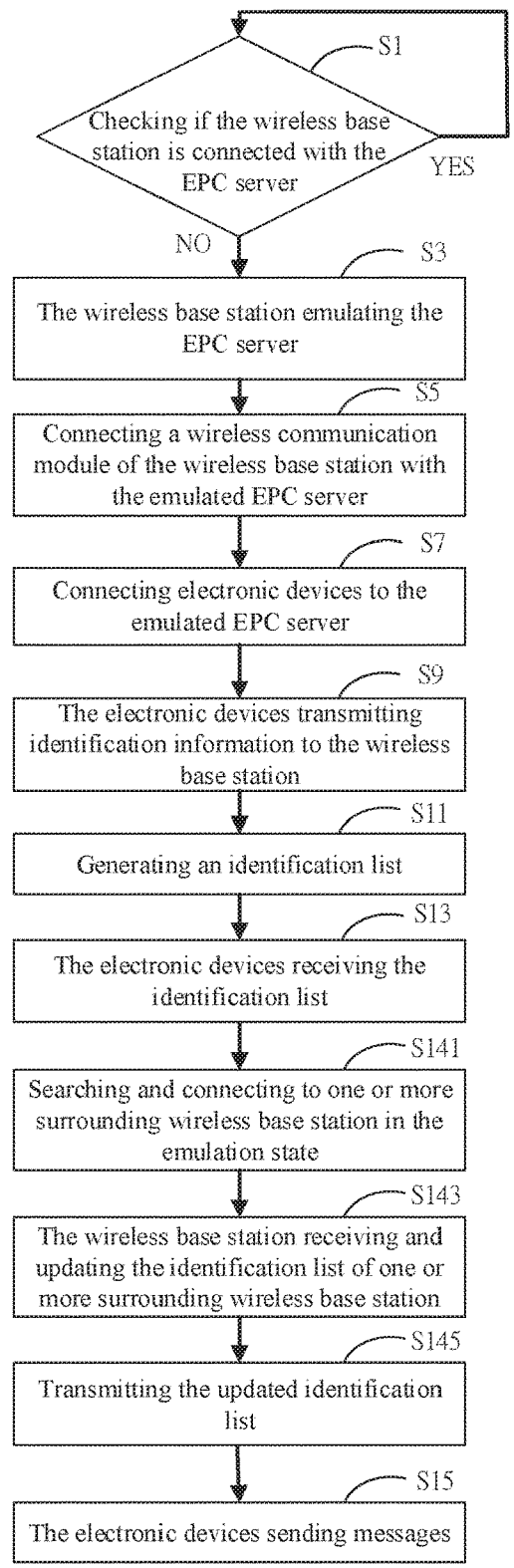
FIG. 4 shows a flowchart of the local communication wireless network system according to the second embodiment of the present invention.

Next, the process of the local communication wireless network method according to the second embodiment of the present invention will be described. Please refer to FIG. 4, which shows a flowchart of the local communication wireless network method according to the second embodiment of the present invention. The difference between the process according to the present embodiment and the one according to the first embodiment is that the method according to the present embodiment further comprises a step S141 for searching and connecting one or more surrounding wireless base station in the emulation state, a step S143, in which the wireless base station receives and updates the identification list of the one or more surrounding wireless base station, and a step S145 for transmitting the updated identification list.

Figure 5A:
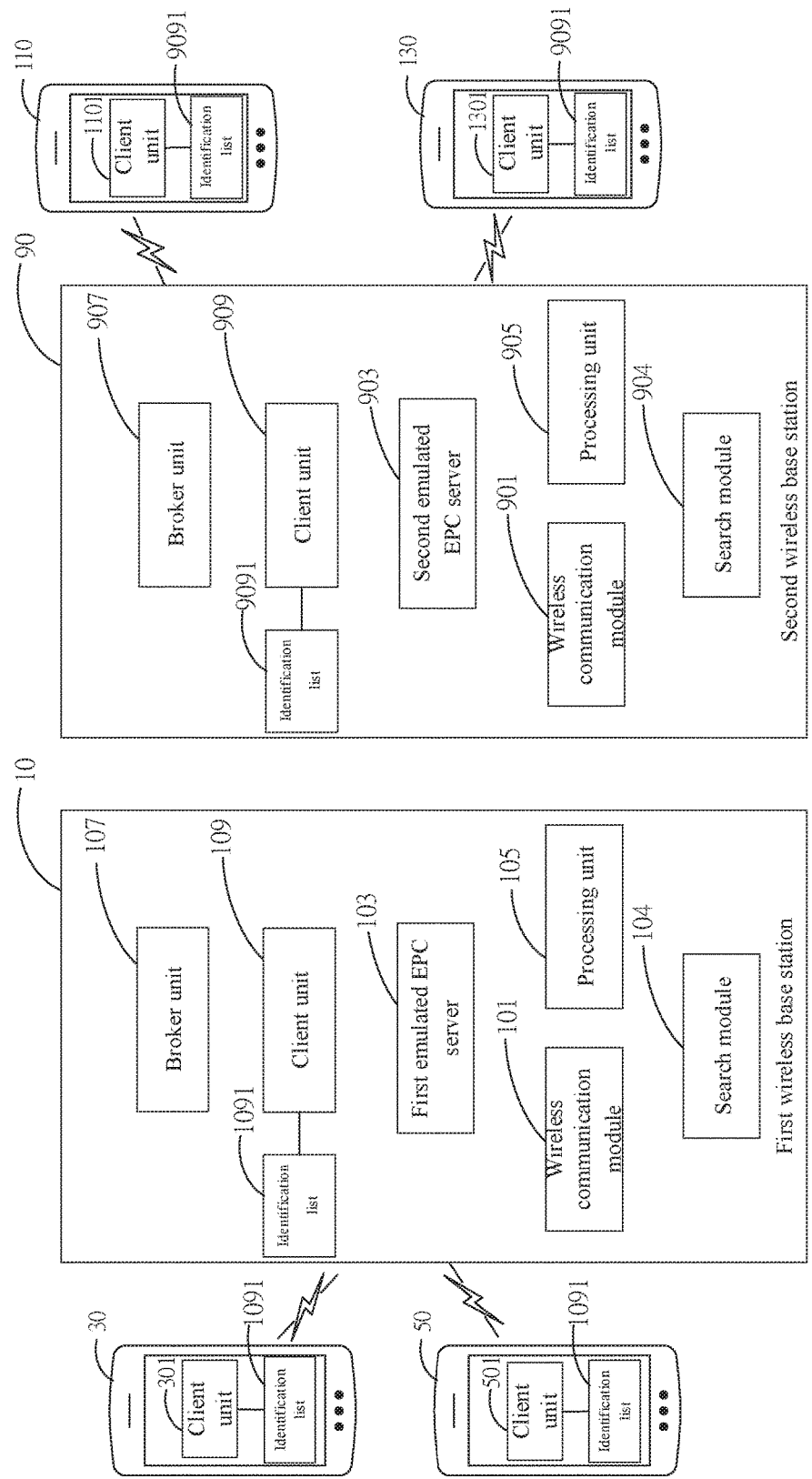
FIG. 5A shows a block diagram of the local communication wireless network system according to the second embodiment of the present invention.

Next, the local communication wireless network system according to the second embodiment of the present invention will be described. Please refer to FIG. 5A, which shows a block diagram of the local communication wireless network system according to the second embodiment of the present invention. The difference between the system according to the present embodiment and the one according to the first embodiment is that the former further comprises a second wireless base station 90, a third electronic device 110, and a fourth electronic device 130. Like the first wireless base station 10, the second wireless base station 90 and the electronic devices 110, 130 are not connected to the EPC server, and the second wireless base station 90 is in the emulation state for the EPC server. In addition, the first wireless base station 10 further comprises a search module 104. The second wireless base station 90 described above includes a wireless communication module 901, a second emulated EPC server 903, a search module 904, a processing unit 905, a broker unit 907, a client unit 909, and an identification list 9091. A plurality of electronic devices are connected with the second wireless base station 90. The electronic devices connected with the second wireless base station 90 include the third and fourth electronic devices 110, 130. The third electronic device 110 includes a client unit 1101 and the identification list 9091; the fourth electronic device 130 includes a client unit 1301 and the identification list 9091. The identification list 9091 records all corresponding identification information of the electronic devices connected with the second wireless base station 90.

The above third electronic device 110 and the fourth electronic device 130 can be an electronic device having wireless networking functionality, such as a smartphone, a PDA, a tablet computer, a notebook computer, and a desktop computer.

The wireless communication module 901 of the above second wireless base station 90 has identical functions of the wireless communication module 101 of the first wireless base station 10. The above second emulated EPC server 903 has identical functions of the first emulated EPC server 103. The processing unit 905 of the above second wireless base station 90 has identical functions of the processing unit 105 of the first wireless base station 10. The broker unit 907 of the above second wireless base station 90 has identical functions of the broker unit 107 of the first wireless base station 10. The client unit 909 of the above second wireless base station 90 has identical functions of the client unit 109 of the first wireless base station 10.

The above search modules 104, 904 can search surrounding wireless base stations by sending request packets via wired or wireless networks.

According to the present embodiment, the second wireless base station 90 is used for description. In practical situations, a plurality of wireless base stations can be adopted.

In the following, the process of the local communication wireless network method according to the second embodiment of the present invention will be described. Please refer to FIGS. 5B to 5D as well as FIGS. 4 and 5A. The steps S to S13 according to the present embodiment are identical to those according to the first embodiment. Hence, the details will not be described again.

Figure 5B:
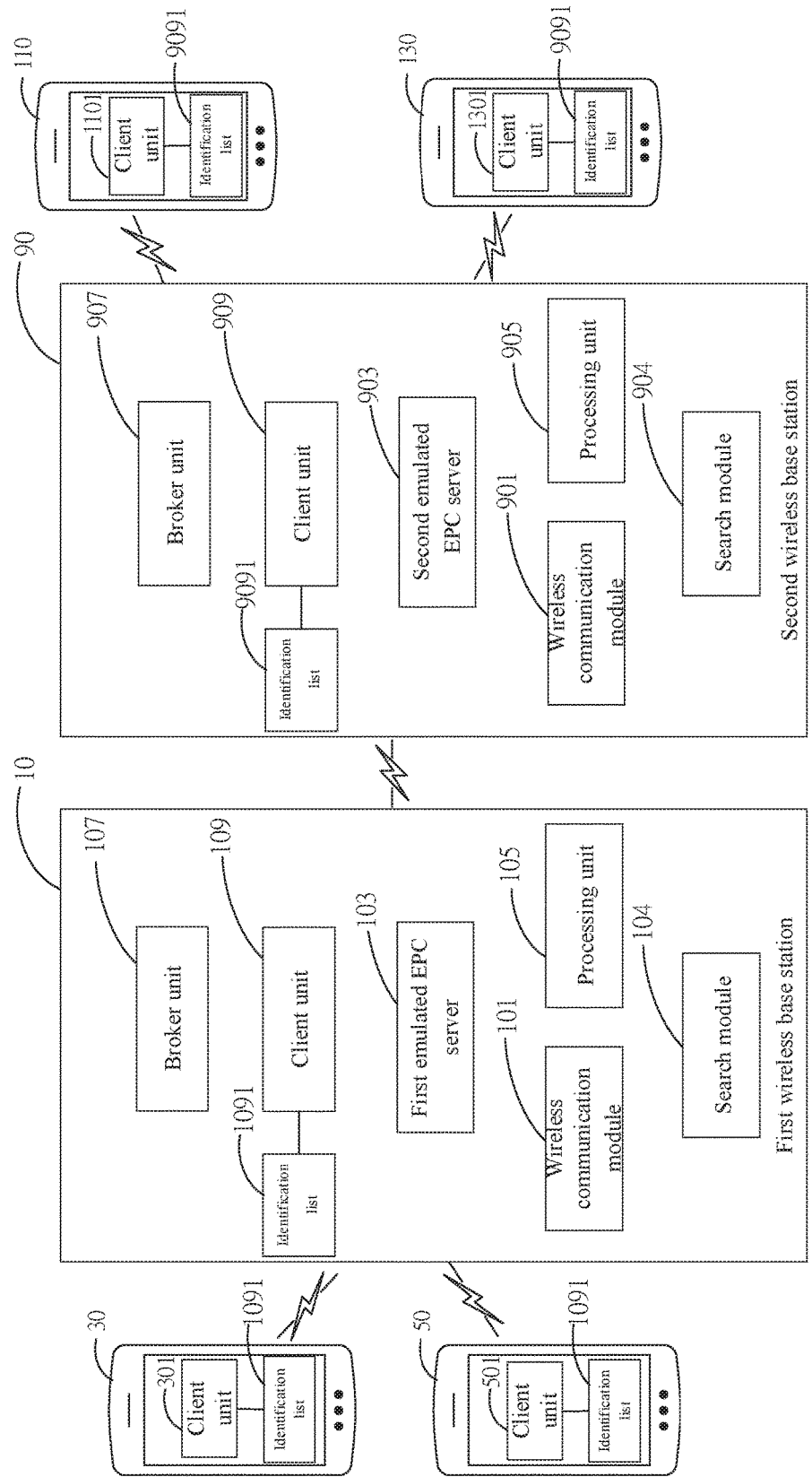
FIGS. 5B to 5D show schematic diagrams of the operations of the local communication wireless network system according to the second embodiment of the present invention.

In the step S141, one or more surrounding wireless base station in the emulation state are searched and connected. As shown in FIG. 5B, the wireless base stations are disposed manually by considering the communication range, transmission power, and signal attenuation for location selection. Thereby, in general, there will be nearby wireless base stations surrounding a wireless base station. As a consequence, the search module 104 of the first wireless base station 10 will search and get surrounding wireless base stations in the emulation state that emulate the EPC server 70 for extending the range of the wireless local area network.

During the process of disposing wireless base stations, the nearby wireless base stations will be configured to the same network segment in advance. The first wireless base station 10 can use the ping command to search the surrounding wireless base stations. For example, the first wireless base station 10 belongs to the network segment 10.102.81.XX. The search module 104 can transmit a ping packet to one or more IP address in the network segment of the first wireless base station 10, namely, 10.102.81.1~10.102.81.255. If the search module 104 receives a response packet corresponding to the transmitted ping packet, it means that the surrounding wireless base station corresponding to the IP address is in the emulation state. For example, the search module 104 transmits ping packets to the IP addresses 10.102.81.1 to 10.102.81.255 and receives two response packets corresponding to the IP addresses of 10.102.81.5 and 10.102.81.91. It means that the wireless base stations corresponding to these two IP addresses are in the emulation state.

In addition, the search module 104 can also search other surrounding wireless base station in the emulation state via the address resolution protocol (ARP). The search module 104 can transmit an ARP request packet to one or more IP address in the network segment of the first wireless base station 10, namely, 10.102.81.1~10.102.81.255. If the search module 104 receives an ARP response packet corresponding to the ARP request packet, it means that the surrounding wireless base station corresponding to the ARP response packet is in the emulation state.

Moreover, the first wireless base station 10 and the surrounding base stations can be set to the same group during the configuration process. If the search module 104 receives a group broadcast packet, it means that the surrounding wireless base station corresponding to the IP address in the group broadcast packet is in the emulation state.

Alternatively, a neighbor list can be stored in the first wireless base station 10 during the process of configuring the first wireless base station 10. This neighbor list records the IP addresses of one or more surrounding wireless base stations of the first wireless base station 10. The search module 104 will transmits request packets according to the IP addresses recorded in the neighbor list. If the search module 104 receives a response packet corresponding to the request packet, it means that the surrounding wireless base station corresponding to the IP address is in the emulation state.

Furthermore, the search module 104 can also use a distributed hash table (DHT) method to search other wireless base stations. While searching, the search module 104 transmits a request packet to the surrounding base stations according to a key. If the search module 104 receives a response packet corresponding to the request packet, it means that the surrounding wireless base station is in the emulation state.

After the search module 104 of the first wireless base station 10 searches and gets the surrounding wireless base station (according to the present embodiment, the first wireless base station 10 searches and gets the second wireless base station 90), the first emulated EPC server 103 is connected to the second EPC server 903 using a wired or wireless networking method.

Figure 5C:
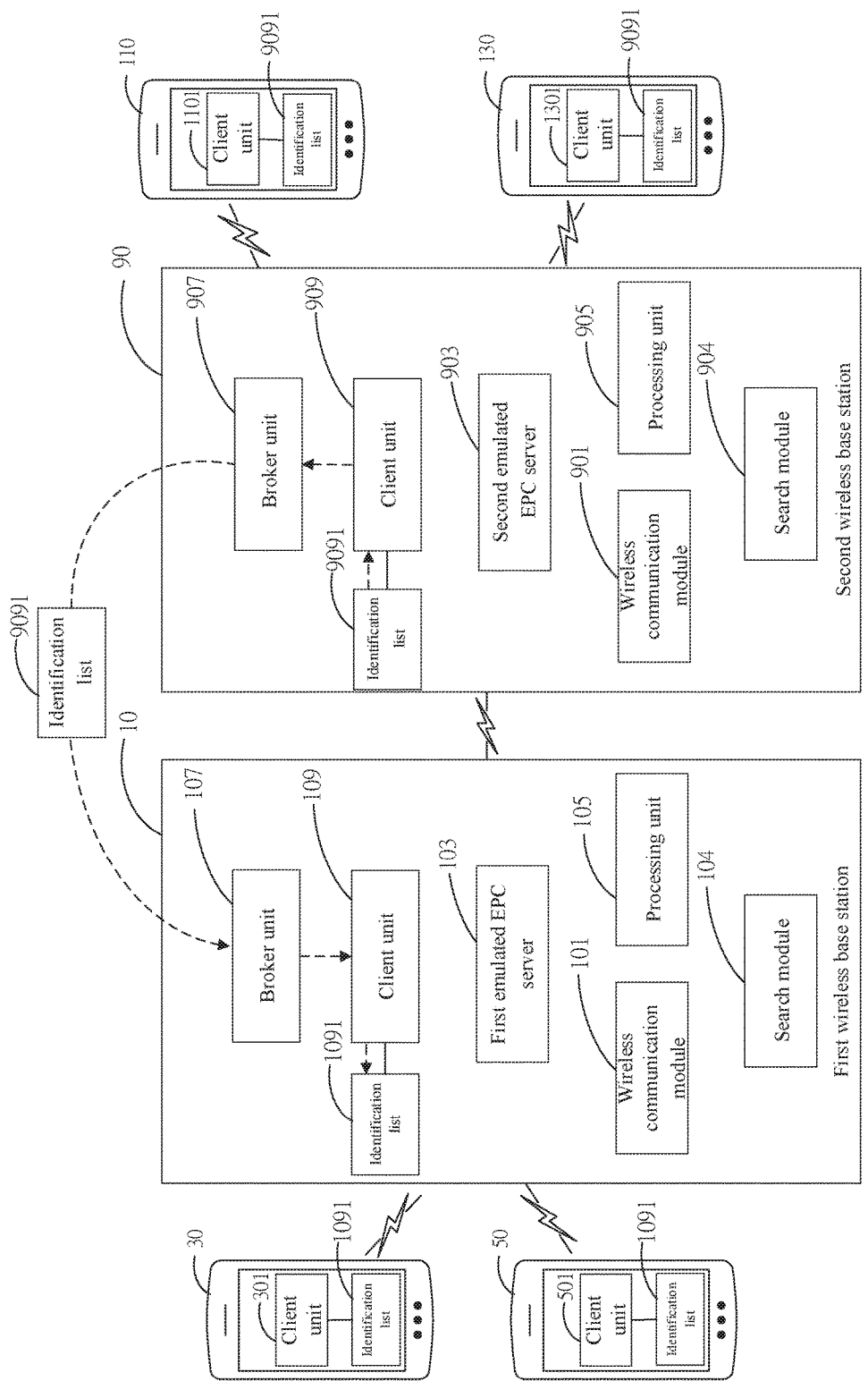

In the step S143, the wireless base station receives and updates the identification list of one or more surrounding wireless base station. As shown in FIG. 5C, when the first and second wireless base stations are connected 10, 90, the client unit 909 of the second wireless base station 90 publishes the identification list 9091 of the second wireless base station 90. The broker unit 907 receives the identification list 9091 and transmits the identification list 9091 to the broker unit 107 of the first wireless base station 10 using the wired or wireless network between the first and second wireless base stations 10, 90. The broker unit 107 is preset that the client unit 109 of the first wireless base station 10 has subscribed the identification list 9091. Thereby, the broker unit 107 will transmit the received identification list 9091 to the client unit 109 of the first wireless base station 10 as it receives the identification list 9091. After the client unit 109 receives the identification list 9091, the client unit 109 will record the identification information recorded in the identification list 9091 and the corresponding electronic devices of the identification information to the identification list 1091 for updating the identification list 1091 of the first wireless base station 10.

Figure 5D:
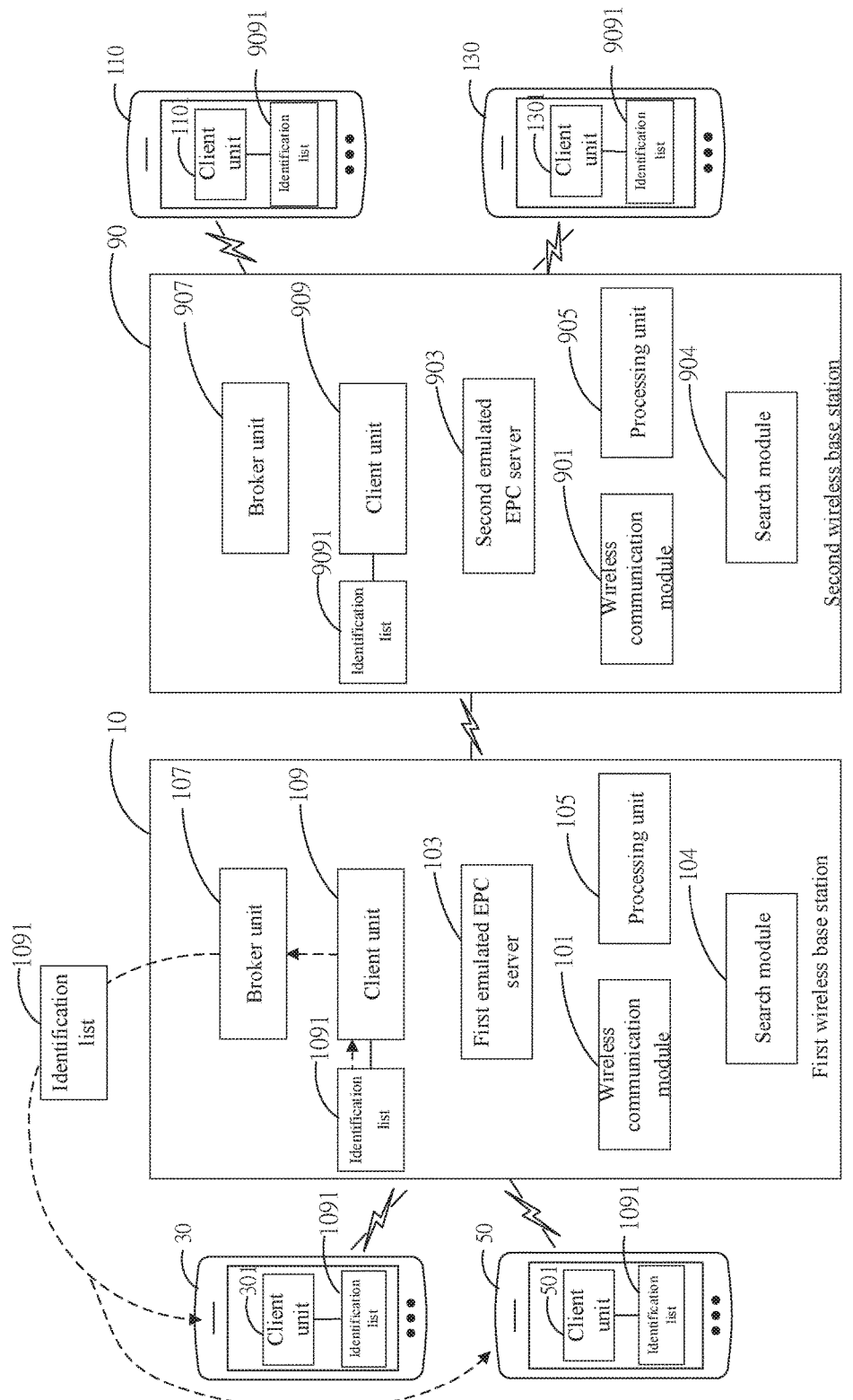

In the step S145, the updated identification list is transmitted. As shown in FIG. 5D, after the identification list 1091 of the first wireless base station 10 is updated, the client unit 109 of the first wireless base station 10 publishes the updated identification list 1091 to the broker unit 107. The broker unit 107 then transmits the updated identification list 1091 to the electronic devices subscribing the identification list 1091. Alternatively, the broker unit 107 transmits the updated identification list 1091 to each electronic device in the update identification list 1091 according to the updated identification list 1091. According to the present embodiment, the broker unit 107 transmits the updated identification list 1091 to the first electronic device 30 and the second electronic device 50. After the client units of the electronic devices receive the identification list, the updated identification list 1091 will replace the original one. Next, in the step S15, the electronic devices can send messages or perform digital voice or video calls to other electronic devices according to the update identification list 1091. For example, the first electronic device 30 can send messages to the third electronic device 110 or the fourth electronic device 130.

After the steps according to the present embodiment are executed, the range of the wireless local area network is broadened to the electronic devices 30, 50, 110, 130 connected to the first and second wireless base stations 10, 90. The first and second electronic devices 30, 50 can transmit messages or perform voice or video calls with the third electronic device 110 or the fourth electronic device 130 through the wired or wireless network between the first wireless base station 10 and the second wireless base station 90.

In the following, the local communication wireless network method according to the third embodiment will be described. The present embodiment is applied when the connection between the wireless base station and the electronic devices originally connected with the wireless base station is broken. Please refer to FIGS. 6A and 6B.

Figure 6A:
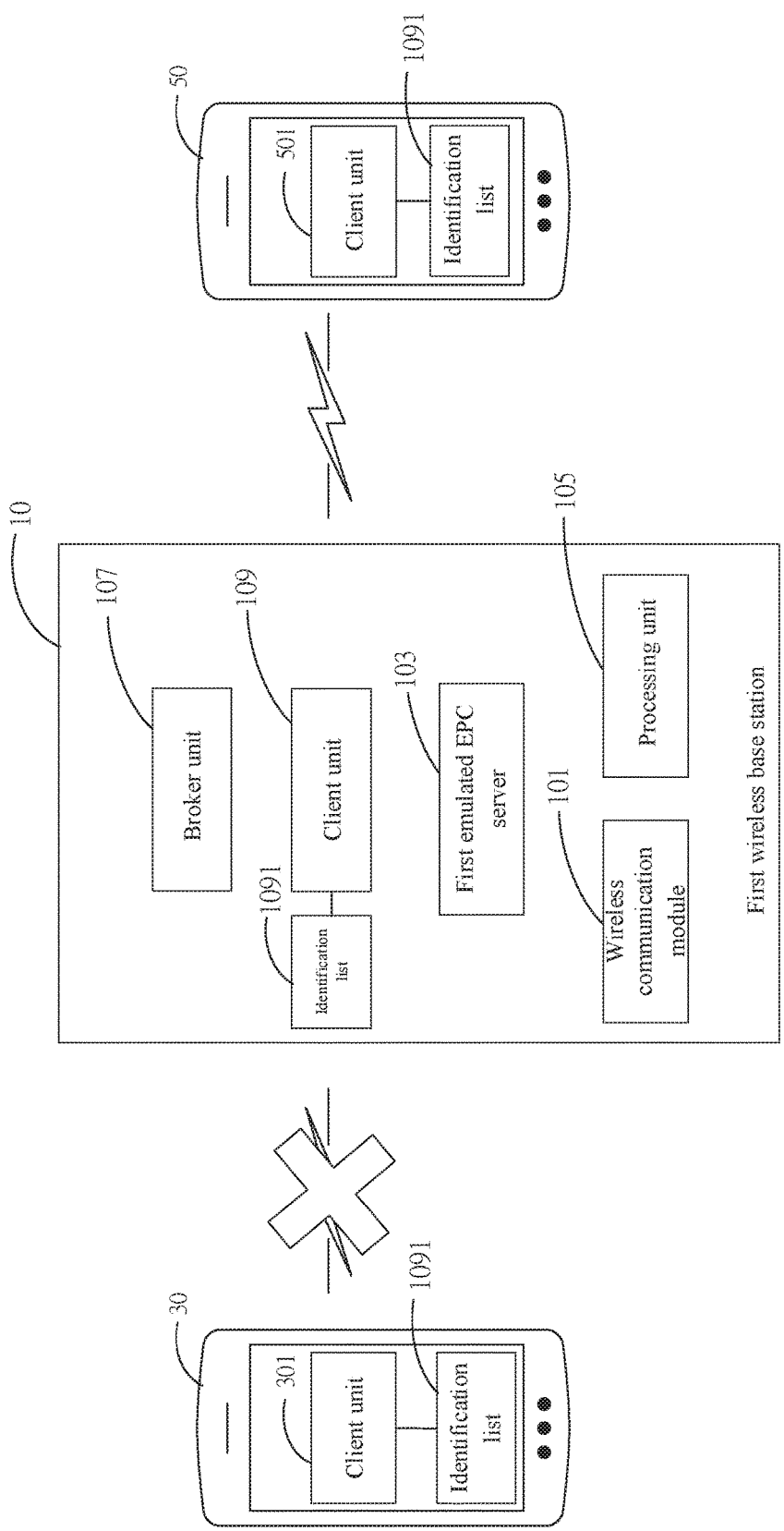
FIGS. 6A to 6B show schematic diagrams of the operations of the local communication wireless network system according to the third embodiment of the present invention.

As shown in FIG. 6A, the processing unit 105 of the first wireless base station 10 checks if the connections between the electronic devices and the wireless base station 10 are normal periodically. In FIG. 6A, the processing unit 105 detects that the connection between the first electronic device 30 and the wireless base station 10 is broken. The processing unit 105 judges if the connection between wireless base station 10 and the first electronic device 30 is normal by the wireless communication module 101 pinging the electronic device or the heartbeat detection result in the SCTP protocol.

Figure 6B:
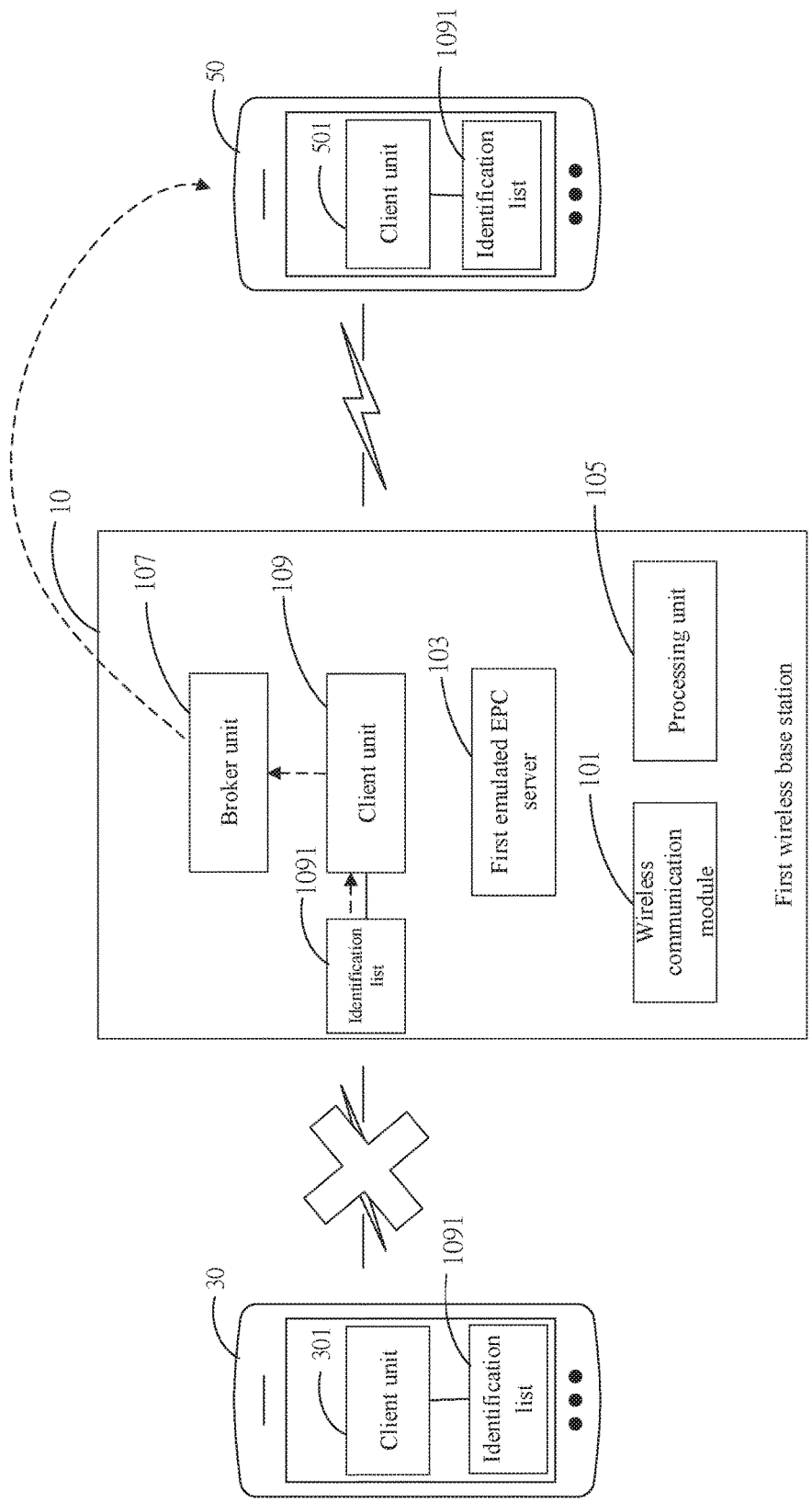

As shown in FIG. 6B, when the processing unit 105 detects that the connection between the first wireless base station 10 and the first electronic device 30 is broken, the processing unit 105 will notify the broker unit 107. The broker unit 107 will drive the client unit 109 to update the identification list 1091. The method for updating the identification list 1091 is to remove the corresponding identification information of the first electronic device 30 from the identification list 1091. After the identification list 1091 is updated, the client unit 109 will publish the updated identification list 1091 to the broker unit 107, which then transmits the updated identification list 1091 to the client units of the electronic devices connected with the first wireless base station 10.

According to the present embodiment, the processing unit of the wireless base station checks if the connection between the electronic device and the wireless base station 10 is broken periodically. If so, the wireless base station will remove the electronic device and the corresponding identification information of the electronic device from the identification list and update the identification list in the electronic devices connected with the wireless base station. Thereby, each electronic device connected with the wireless base station can know the connection between some electronic device and the wireless base station is broken and thus avoiding sending messages to the electronic device not connected with the wireless base station.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A local communication wireless network method, applicable when a wireless base station is not connected to an evolved packet core server, comprising steps of:
    said wireless base station emulating said evolved packet core server;
    connecting a wireless communication module of said wireless base station to said emulated evolved packet core server;
    connecting a plurality of electronic devices including a first electronic device and a second electronic device to said emulated evolved packet core server via said wireless communication module;
    each of said plurality of electronic devices transmitting its own identification information to said wireless base station;
    generating an identification list according to said identification information of each of said plurality of electronic devices;
    sending said identification list to each of said plurality of electronic devices in said identification list; and
    said first electronic device sending a message to said second electronic device according to said identification information corresponding to said second electronic device in said identification list;
    wherein when said first electronic device is not connected with said wireless base station, further comprising steps of:
    updating said identification list by removing said identification information of said first electronic device from said identification list; and
    transmitting said updated identification list to each electronic devices in said updated identification list.

2. The local communication wireless network method of claim 1, wherein said message includes said identification information of said second electronic device and a message body.

3. The local communication wireless network method of claim 2, wherein said message body includes text, pictures, voice, video, or an arbitrary combination of the above.

4. The local communication wireless network method of claim 1, wherein said identification information of each of said plurality of electronic devices includes an identification code, a phone number, a media access control address, or an arbitrary combination of the above.

5. The local communication wireless network method of claim 1, and further comprising a step of assigning a local IP address to each of said plurality of electronic devices.

6. The local communication wireless network method of claim 5, wherein said identification information of each of said plurality of electronic devices includes an identification code, a phone number, a media access control address, said local IP address, or an arbitrary combination of the above.

7. The local communication wireless network method of claim 6, wherein said first electronic device performs a digital voice or video call with said second electronic device via said emulated evolved packet core server according to said local IP address in said identification information of said second electronic device.

8. The local communication wireless network method of claim 1, and comprising steps of:
    connecting said wireless base station to one or more surrounding wireless base station in the emulation state;
    receiving an identification list of said surrounding wireless base station transmitted by said surrounding wireless base station and updating said identification list of said wireless base station according to said identification list of said surrounding wireless base station; and
    transmitting said updated identification list to each electronic device in said updated identification list.

9. A local communication wireless network system, comprising:
    a wireless base station, comprising an emulated evolved packet core server, a wireless communication module, a broker unit, and a client unit, said emulated evolved packet core server emulating an evolved packet core server, said wireless communication module connected to said evolved packet core server or said emulated evolved packet core server; and a plurality of electronic devices, including a first electronic device and a second electronic device, each of said plurality of electronic devices including a client unit, and said plurality of electronic devices connected to said evolved packet core server or said emulated evolved packet core server via said wireless communication module;

where when said wireless base station is not connected to said evolved packet core server, said emulated evolved packet core server emulates said evolved packet core server; said wireless communication module is connected to said emulated evolved packet core server; said plurality of electronic devices are connected to said emulated evolved packet core server via said wireless communication module; each of said plurality of electronic devices transmits its own identification information to said broker unit; said broker unit receives said identification information of each of said plurality of electronic devices and transmits said identification information to said client unit of said wireless base station; said client unit of said wireless base station generates an identification list according to said identification information of each of said plurality of electronic devices and sends said identification list to said broker unit; said broker unit sends said identification list to each of said plurality of electronic devices in said identification list; and said first electronic device sends a message to said second electronic device according to said identification information corresponding to said second electronic device in said identification list; when said first electronic device is not connected with said wireless base station, said client unit of said wireless base station removes said identification information of said first electronic device from said identification list for updating said identification list; said client unit of said wireless base station transmits said updated identification list to said broker unit; and said broker unit transmits said updated identification list to each electronic device in said updated identification list.

10. The local communication wireless network system of claim 9, wherein said message includes said identification information of said second electronic device and a message body.

11. The local communication wireless network system of claim 10, wherein said message body includes text, pictures, voice, video, or an arbitrary combination of the above.

12. The local communication wireless network system of claim 9, wherein said identification information of each of said plurality of electronic devices includes an identification code, a phone number, a media access control address, or an arbitrary combination of the above.

13. The local communication wireless network system of claim 9, wherein said emulated evolved packet core server assigns a local IP address to each of said plurality of electronic devices.

14. The local communication wireless network system of claim 13, wherein said identification information of each of said plurality of electronic devices includes an identification code, a phone number, a media access control address, said local IP address, or an arbitrary combination of the above.

15. The local communication wireless network system of claim 14, wherein said first electronic device performs a digital voice or video call with said second electronic device via said emulated evolved packet core server according to said local IP address in said identification information of said second electronic device.

16. The local communication wireless network system of claim 9, and further comprising one or more surrounding wireless base station in the emulation state; said wireless base station connecting to said surrounding wireless base station; said broker unit of said wireless base station receiving an identification list of said surrounding wireless base station transmitted by said surrounding wireless base station and transmitting said identification list of said surrounding wireless base station to said client unit of said wireless base station; said client unit of said wireless base station updating said identification list of said wireless base station according to said identification list of said surrounding wireless base station; said client unit of said wireless base station transmitting said updated identification list to said broker unit; and said broker unit transmitting said updated identification list to each electronic device in said updated identification list.

* * * * *